(12) United States Patent
Stasiewich et al.

(10) Patent No.: US 8,096,728 B2
(45) Date of Patent: Jan. 17, 2012

(54) CONNECTOR AND RIG MAT EMPLOYING SAME

(75) Inventors: Brian Matthew Stasiewich, Alberta (CA); Jared Michael Bathelt, Alberta (CA)

(73) Assignee: Strad Energy Services, Ltd., Medicine Hat, Alberta (CA)

( * ) Notice: Subject to any disclaimer, the term of this patent is extended or adjusted under 35 U.S.C. 154(b) by 112 days.

(21) Appl. No.: 12/476,949

(22) Filed: Jun. 2, 2009

(65) Prior Publication Data
US 2009/0297266 A1    Dec. 3, 2009

Related U.S. Application Data

(60) Provisional application No. 61/129,060, filed on Jun. 2, 2008.

(51) Int. Cl.
*E01C 9/10*     (2006.01)
*E01C 5/00*     (2006.01)
*E04B 2/00*     (2006.01)
*B25G 3/00*     (2006.01)

(52) U.S. Cl. ......... 404/41; 404/36; 52/588.1; 403/263

(58) Field of Classification Search ........... 404/35, 404/36, 41; 52/591.1, 591.3, 36.6, 588.1, 52/592.1; 403/375, 376, 379.5, 381, 56, 403/59, 61, 68, 331, 63, 52, 65, 361, 263
See application file for complete search history.

(56) References Cited

U.S. PATENT DOCUMENTS

| | | | |
|---|---|---|---|
| 2,652,753 A | 9/1953 | Smith | |
| 3,202,067 A | 8/1965 | Michard et al. | |
| 3,348,549 A | 10/1967 | Brodmann et al. | |
| 3,356,142 A * | 12/1967 | Crow et al. | 166/134 |
| 3,679,531 A | 7/1972 | Wienand et al. | |
| 4,044,497 A * | 8/1977 | Bettens | 446/96 |
| 4,289,420 A | 9/1981 | Davis | |
| 4,410,024 A | 10/1983 | Folse, Sr. | |
| 4,462,712 A | 7/1984 | Penland, Sr. | |
| 4,568,584 A * | 2/1986 | Holland | 428/44 |
| 4,594,829 A | 6/1986 | Herrgord | |
| 4,600,336 A | 7/1986 | Waller, Jr. | |
| 4,889,444 A | 12/1989 | Pouyer | |
| 4,922,598 A | 5/1990 | Pouyer | |
| 4,973,193 A | 11/1990 | Watson | |
| 4,973,505 A | 11/1990 | Bielous | |

(Continued)

FOREIGN PATENT DOCUMENTS

CA    2462302    8/2005

*Primary Examiner* — Thomas Will
*Assistant Examiner* — Abigail A Risic
(74) *Attorney, Agent, or Firm* — Knobbe, Martens, Olson & Bear, LLP

(57) ABSTRACT

A connector apparatus includes first and second spaced apart generally coplanar walls and a support between the first and second walls. The first wall includes a first guiding surface and a first stopping surface extending at a first angle to the first guiding surface. The second wall includes a second guiding surface opposite at least a portion of the first guiding surface and generally facing towards the first guiding surface, a second stopping surface extending from the second guiding surface and away from the first guiding surface, and a third stopping surface extending at a second angle to the second stopping surface. The support has a fourth stopping surface, and the fourth stopping surface is disposed at third and fourth angles to the first and third stopping surfaces respectively.

23 Claims, 16 Drawing Sheets

U.S. PATENT DOCUMENTS

| | | |
|---|---|---|
| 5,032,037 A | 7/1991 | Phillips |
| 5,050,362 A | 9/1991 | Tal et al. |
| 5,098,218 A | 3/1992 | Reese et al. |
| 5,204,149 A | 4/1993 | Phenicie et al. |
| 5,215,802 A | 6/1993 | Sijpesteijn |
| 5,234,204 A | 8/1993 | Hunt |
| 5,383,742 A * | 1/1995 | Grace .............................. 404/15 |
| 5,810,511 A | 9/1998 | Schmidt |
| 5,833,386 A | 11/1998 | Rosan et al. |
| D402,063 S | 12/1998 | Dickey |
| 5,971,655 A | 10/1999 | Shirakawa |
| 6,021,646 A | 2/2000 | Burley et al. |
| 6,089,784 A * | 7/2000 | Ardern ............................ 404/41 |
| 6,260,828 B1 | 7/2001 | English |
| 6,324,796 B1 | 12/2001 | Heath |
| D465,857 S * | 11/2002 | Ardern ........................ D25/138 |
| 6,523,243 B2 | 2/2003 | Philips et al. |
| 6,652,183 B2 | 11/2003 | Stasiewich et al. |
| 6,733,206 B2 | 5/2004 | Stasiewich et al. |
| 6,745,452 B1 | 6/2004 | Harrison |
| 6,769,835 B2 * | 8/2004 | Stridsman ....................... 404/41 |
| 6,945,732 B2 | 9/2005 | Renick |
| 6,991,399 B2 * | 1/2006 | Park et al. ..................... 403/355 |
| 7,025,530 B2 | 4/2006 | Beamish et al. |
| 7,131,161 B2 | 11/2006 | Lee |
| 7,160,055 B2 | 1/2007 | Beamish et al. |
| 7,210,211 B2 | 5/2007 | Harrison |
| 7,300,224 B2 | 11/2007 | Slater |
| 2008/0193213 A1 | 8/2008 | Harrison |

\* cited by examiner

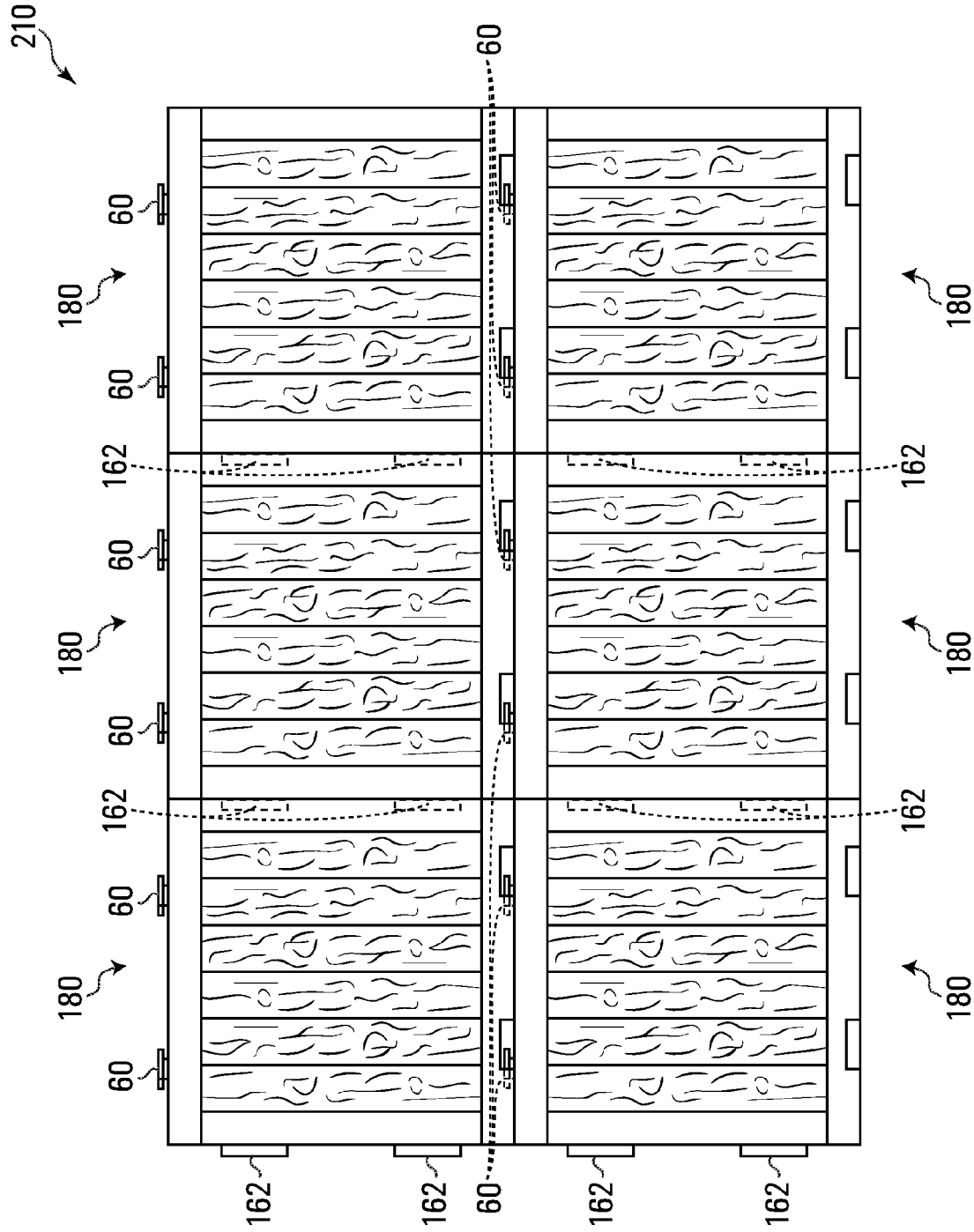

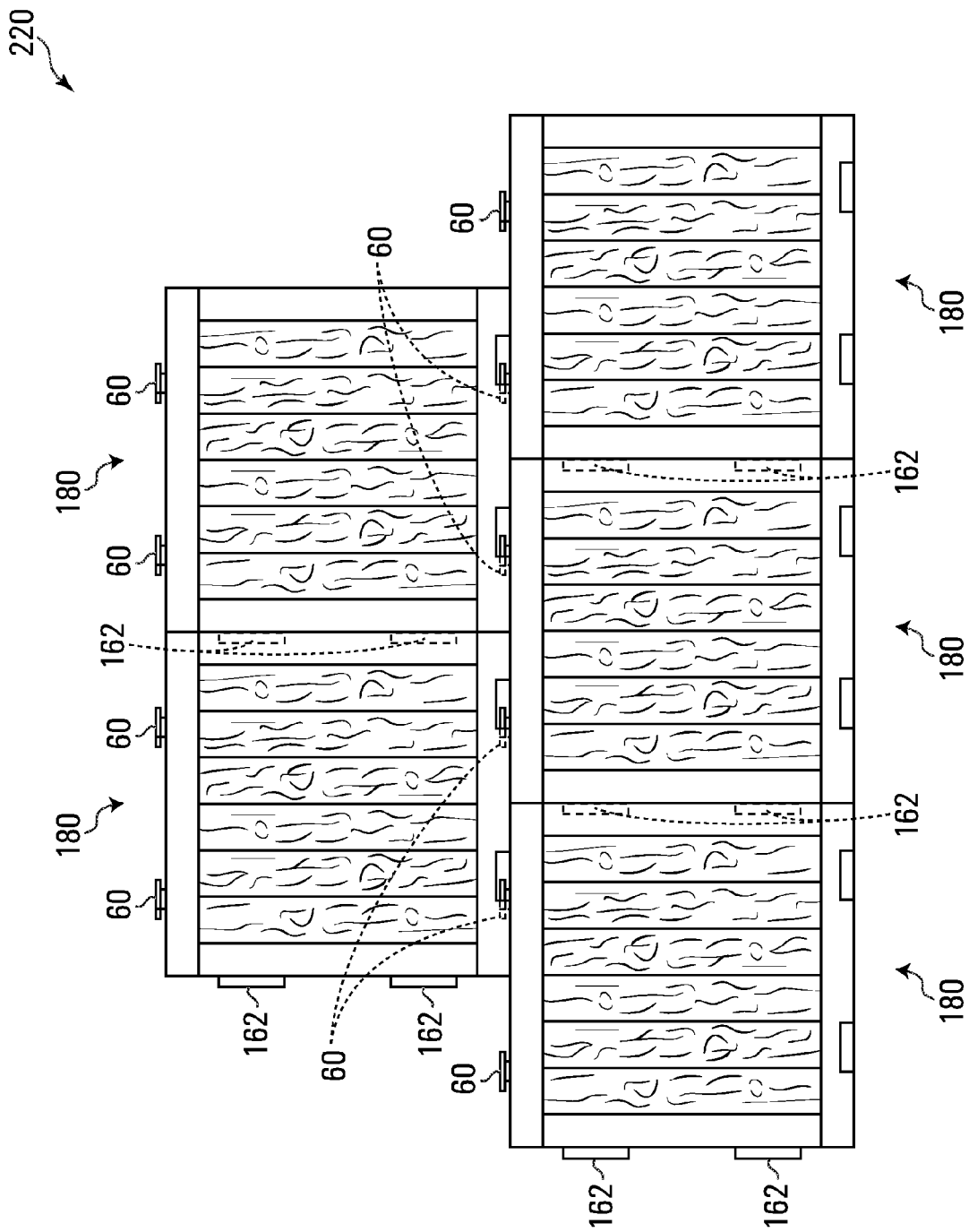

CONNECTOR AND RIG MAT EMPLOYING SAME

CROSS-REFERENCE TO RELATED APPLICATIONS

This application claims benefit under 35 U.S.C. §119(e) from U.S. provisional patent application No. 61/129,060 filed Jun. 2, 2008, the entire contents of which are incorporated herein by reference.

BACKGROUND OF THE INVENTION

1. Field of Invention

This invention relates generally to interconnection, and more particularly to systems, apparatus, and methods for interconnection, and to a rig mat employing same.

2. Description of Related Art

Rig mats, which are also known as rig pads and road mats, have been used, for example, for constructing roadways, camp mats, and drilling rig platforms on surfaces such as Arctic tundra, in order to provide a temporary rigid surface on which equipment such as motor vehicles can operate. Rig mats may reduce damage to the softer surface below, and may prevent motor vehicles or other objects from becoming caught in the softer surface. Conventional rig mats have been constructed with generally rectangular steel frames supporting wooden platforms within the frames, for example. Some conventional rig mats have been known to weigh approximately 3,000 pounds.

Desirably, rig mats are interconnectable, so that the rig mats may be used and reused to construct temporary surfaces of various desired dimensions. One known connector for interconnecting rig mats involves complementary "L"-shaped appendages. However, it has been found that when the surface underlying the rig mats is soft, spongy, or uneven, these "L"-shaped appendages fail to provide effective engagement because the rig mats can tip up when motor vehicles drive on or off of the mat, which may cause the mats to separate.

One variation of these "L"-shaped appendages includes retaining lips to prevent the mats from tipping and separating when a motor vehicle drives on or off one of the mats. However, this arrangement can still result in undesirably large gaps between adjacent rig mats, and has been found not to provide adequate stability against lateral sliding of adjacent rig mats. Furthermore, this arrangement has been found to be ineffective when debris, mud, ice, or snow, for example, becomes lodged in cavities defined by the appendages.

SUMMARY OF THE INVENTION

In accordance with one aspect of the invention, there is provided a connector apparatus including first and second spaced apart generally coplanar walls and a support between the first and second walls. The first wall includes a first guiding surface and a first stopping surface extending at a first angle to the first guiding surface. The second wall includes a second guiding surface opposite at least a portion of the first guiding surface and generally facing towards the first guiding surface, a second stopping surface extending from the second guiding surface and away from the first guiding surface, and a third stopping surface extending at a second angle to the second stopping surface. At least a portion of the third stopping surface is opposite the first stopping surface. The support has a fourth stopping surface, and at least a portion of the fourth stopping surface is generally opposite the second stopping surface. The fourth stopping surface is disposed at third and fourth angles to the first and third stopping surfaces respectively.

The first and second guiding surfaces and the first, second, third, and fourth stopping surfaces may define an opening generally in a plane.

The first guiding surface may be generally flat.

The second guiding surface may be continuously curved.

The second guiding surface may be generally semi-circular.

The first, second, third, and fourth stopping surfaces may be generally flat.

The second, third, and fourth angles may be generally right angles.

The first and third stopping surfaces may be generally parallel.

The second and fourth stopping surfaces may be generally parallel.

The first and second walls and the support may be integrally formed.

In accordance with another aspect of the invention, there is provided a connectable panel. The connectable panel includes a frame having first and second parallel and spaced apart edges, the first edge including at least one connector apparatus. The connectable panel also includes at least one projection projecting away from the second edge, the projection having first and second opposite ends, the first end being coupled to the second edge, and the second end having a retainer thereon. The first and second guiding surfaces of the at least one connector apparatus are positioned to permit passage therebetween of a projection of a first adjacent connectable panel. The first, second, third, and fourth stopping surfaces of the connector apparatus are positioned to hold the projection of the first adjacent connectable panel releasably therebetween and to prevent a retainer on the projection of the first adjacent connectable panel from passing therebetween. The frame and the connector apparatus define a cavity for receiving the retainer of the first adjacent connectable panel when the projection of the first adjacent connectable panel is moved between the first and second guiding surfaces and when the projection of the first adjacent connectable panel is positioned between the first, second, third, and fourth stopping surfaces of the connector apparatus.

The at least one projection may have a generally rectangular cross section.

The retainer may include a generally rectangular plate.

The generally rectangular plate may include third and fourth generally perpendicular edges, and a fifth edge extending at an angle between the third and fourth edges.

The at least one connector apparatus may include first and second connector apparatuses, and the at least one projection may include first and second projections.

The first and second connector apparatuses may be spaced apart by a first distance, and the first and second projections may be spaced apart by the first distance.

The first edge may have third and fourth ends, and the second edge may have fifth and sixth ends. The first and second edges may have a common length approximately two times the first distance, the first connector apparatus may be approximately one quarter of the common length from the third end, the second connector apparatus may be approximately one quarter of the common length from the fourth end, the first projection may be approximately one quarter of the common length from the fifth end, and the second projection may be approximately one quarter of the common length from the sixth end.

The frame may include a wall, and the wall and the at least one connector apparatus may define first and second openings in communication with the cavity for permitting passage of a fluid through the cavity for cleaning the cavity.

The connectable panel may further include first and second fluid deflectors for deflecting fluid passing through the first and second openings respectively.

The connectable panel may have a top surface adjacent the first and second guiding surfaces, and the top surface may define an opening in communication with the cavity for receiving the retainer of the first adjacent connectable panel.

The frame may have third and fourth generally parallel and spaced apart edges extending between the first and second edges, and the third edge may include at least one first guide, and the fourth edge may include at least one second guide. The at least one second guide may be generally complementary to the at least one first guide for holding the at least one first guide of a second adjacent connectable panel.

The first guide may include at least one protrusion protruding from the third edge, and the second guide may include at least one recess for holding the at least one protrusion of the second adjacent connectable panel.

The first sliding edge of the at least one connector apparatus may extend across a second distance parallel to the first edge, and the at least one protrusion may extend a third distance from the third edge, the third distance being less than the second distance.

The at least one recess may include an outwardly sloped region for guiding the at least one protrusion of the second adjacent connectable panel into the at least one recess.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings that illustrate embodiments of the invention,

FIG. 15 is a top plan view of a system of rig mats in accordance with an embodiment of the invention, and FIG. 16 is a top plan view of a system of rig mats in accordance with a further embodiment of the invention.

DETAILED DESCRIPTION

Figure 1:
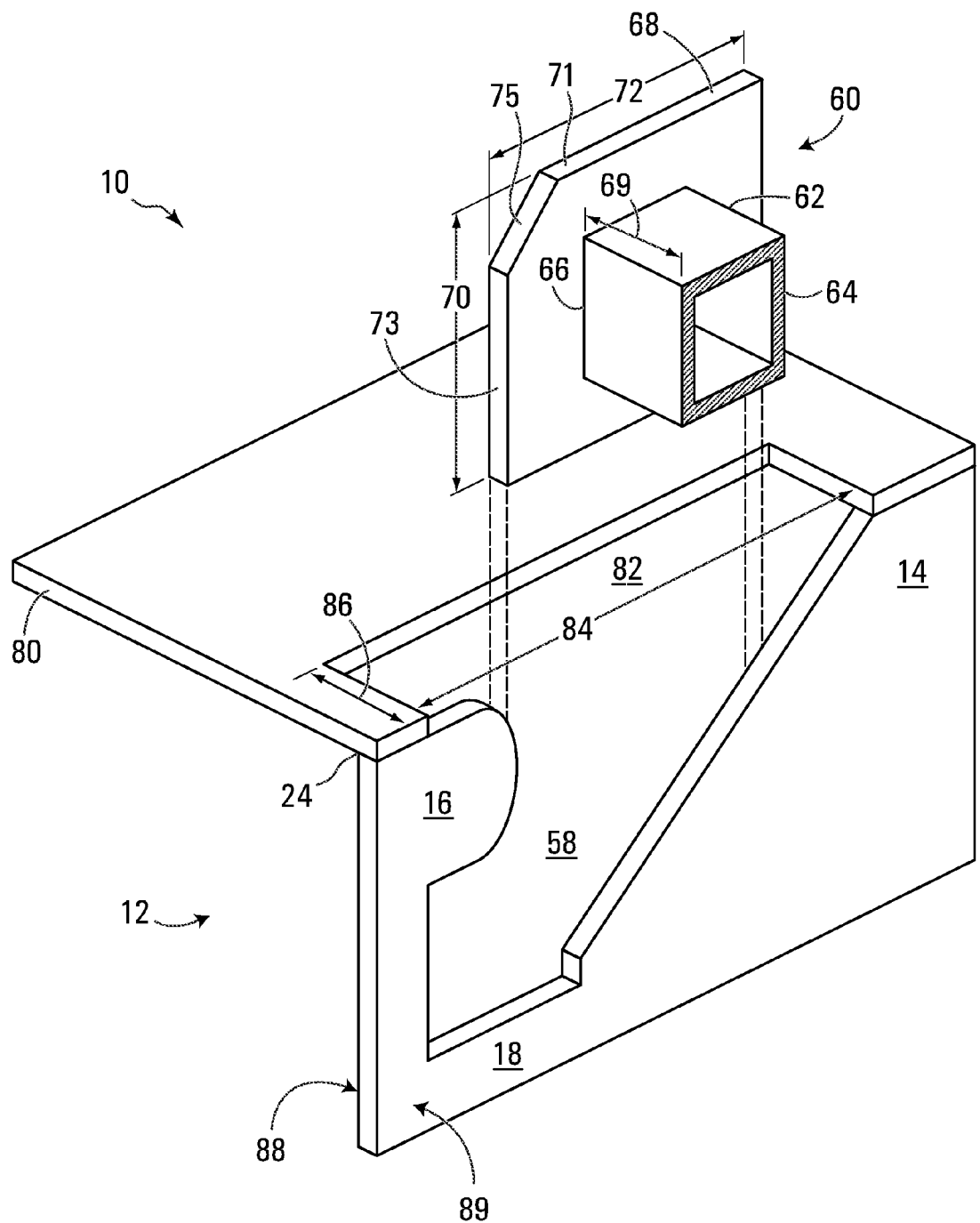
FIG. 1 is a perspective view of a connector system according to a first embodiment of the invention.

Referring to FIG. 1, a connector system according to a first embodiment of the invention is shown generally at 10. The connector system 10 includes a first connector apparatus 12. The first connector apparatus 12 has first and second spaced apart generally co-planar walls 14 and 16, and a support 18 between the first and second walls. In the illustrated embodiment, the first connector apparatus 12 is formed from a unitary and generally planar sheet of metal such as 0.25 inch-thick (0.64 cm-thick) steel plate. However, it will be appreciated that variations may be constructed from one or more suitable materials, which may or may not be unitarily formed, and which need not be planar.

Figure 2:
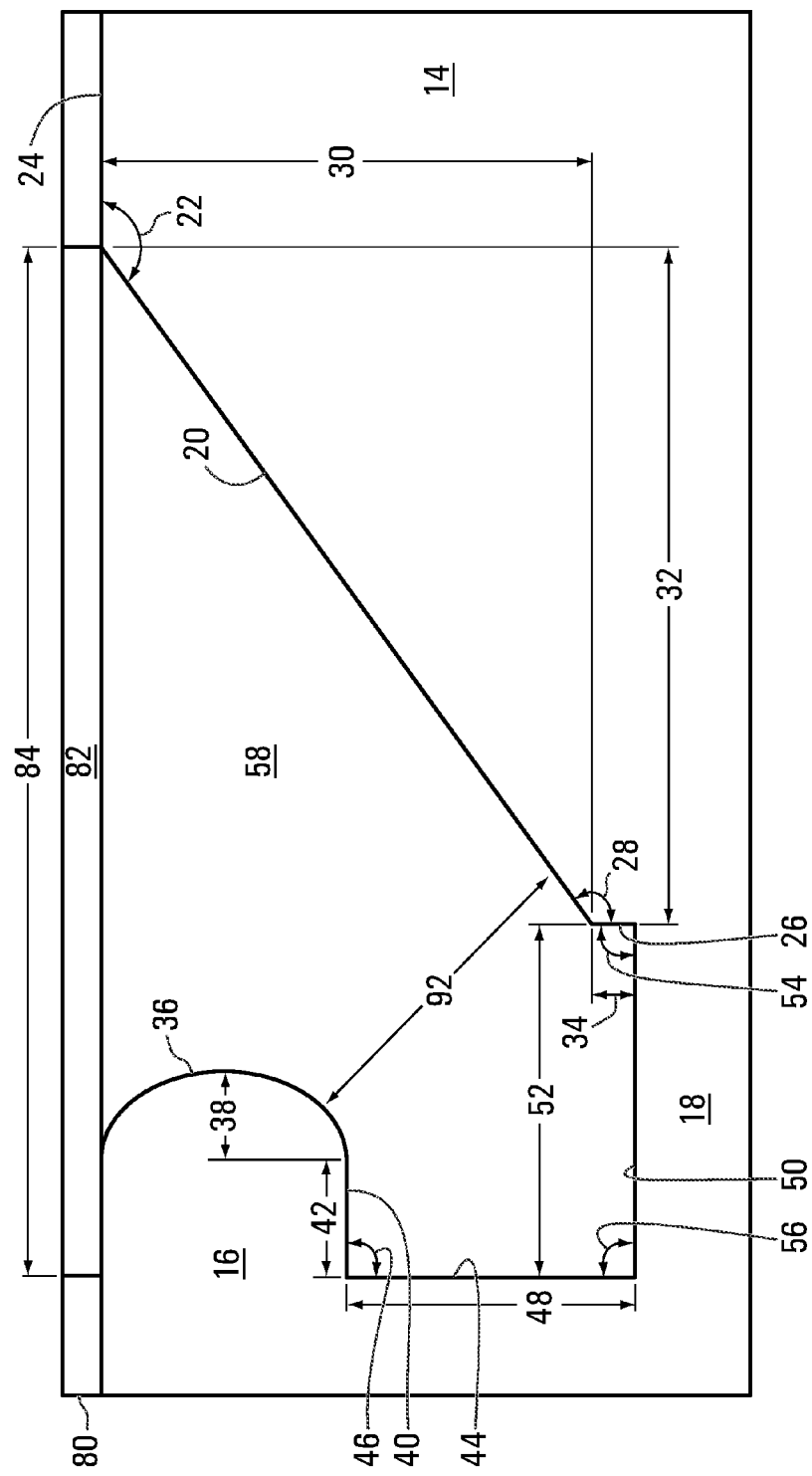
FIG. 2 is a front elevation view of a first connector apparatus according to a first embodiment of the invention.

Referring to FIG. 2, the first wall 14 includes a first guiding surface 20 extending generally at a first angle 22 from a top surface 24 of the first wall. The first wall 14 also includes a first stopping surface 26 extending at a second angle 28 to the first guiding surface 20. In one embodiment, the first guiding surface 20 is flat and extends over a generally straight line having a rise 30 of approximately 4.25 inches (10.8 cm) and a run 32 of approximately 5.75 inches (14.6 cm), and the first stopping surface 26 is generally flat having a height 34 of approximately 0.375 inches (0.95 cm).

The second wall 16 includes a second guiding surface 36 opposite at least a portion of the first guiding surface 20, and facing and protruding towards the first guiding surface. In the illustrated embodiment, the second guiding surface 36 is continuously curved and generally semi-circular, having a radius of curvature 38 of approximately 0.75 inches (1.9 cm). The second wall 16 also includes a second stopping surface 40 transitioning smoothly and extending from the second guiding surface 36 in a direction away from the first guiding surface 20. In the illustrated embodiment, the second stopping surface 40 is generally flat, and has a length 42 of approximately 1 inch (2.54 cm). The second wall 16 also includes a third stopping surface 44 extending at a third angle 46 to the second stopping surface 40. In the illustrated embodiment, the third stopping surface 44 is generally flat, and at least a portion of the third stopping surface is opposite the first stopping surface 26. Also, in the illustrated embodiment, the third stopping surface 44 has a length 48 of approximately 2.5 inches (6.35 cm).

The support 18 has a fourth stopping surface 50, at least a portion of which is generally opposite the second stopping surface 40. In the illustrated embodiment, the fourth stopping surface 50 is generally flat, has a length 52 of approximately 3 inches (7.62 cm), and is disposed at fourth and fifth angles 54 and 56 to the first and third stopping surfaces 26 and 44 respectively.

In the illustrated embodiment, the first and second guiding surfaces 20 and 36 and the first, second, third, and fourth stopping surfaces 26, 40, 44, and 50 define an opening 58 generally in a plane. Also, in the illustrated embodiment, the third, fourth, and fifth angles 46, 54, and 56 are generally right angles, such that the first and third stopping surfaces 26 and 44 are generally parallel, and the second and fourth stopping surfaces 40 and 50 are also generally parallel.

However, it will be appreciated that in alternative embodiments, the first guiding surface 20 need not be flat, and the second guiding surface 36 need not be continuously curved. Furthermore, in alternative embodiments, the first, second, third, and fourth stopping surfaces 26, 40, 44, and 50 need not be flat, and need not be at perfect right angles to each other.

Referring back to FIG. 1, the connector system 10 further includes a second connector apparatus 60. The second connector apparatus 60 includes a projection 62 having a first end 64 and a second end 66, and further includes a retainer 68 extending from the second end 66. In the illustrated embodiment, the projection 62 includes a length of steel channel having a generally square cross section of approximately 2 inches by 2 inches (5.08 cm by 5.08 cm). However, it has been found that in an alternative embodiment, the projection 62 may also have a generally square cross section of approximately 1.5 inches by 1.5 inches (3.81 cm by 3.81 cm).

In the illustrated embodiment, the retainer 68 is formed from a 0.5 inch-thick (1.27 cm-thick) steel plate having a height 70 of approximately 4 inches and a width 72 of approximately 5 inches, although a triangular portion is preferably removed from a corner of the retainer 68 in order to prevent the retainer from engaging an edge of an upper plate 80 adjacent the second wall 16 while the second connector apparatus 60 is inserted in or removed from the first connector apparatus 12, as explained further below. In the illustrated embodiment, the retainer 68 is generally rectangular, and thus has generally perpendicular edges 71 and 73. Removing the triangular portion from the retainer 68 defines an angled edge 75 extending at an angle between the edges 71 and 73. The triangular portion that is removed from the corner of the retainer 68 extends over approximately one quarter of the height 70 and over approximately one quarter of the width 72. The retainer 68 is preferably welded to the second end 66.

Still referring to FIG. 1, the connector system 10 in the illustrated embodiment further includes the upper plate 80 adjacent the top surface 24 of the first connector apparatus 12, and generally perpendicular to the first and second walls 14 and 16. In some embodiments, the upper plate 80 may be a flange of an I-beam, as illustrated below. The upper plate 80 defines an opening 82 extending generally between the first and second guiding surfaces 20 and 36, and away from the first and second walls 14 and 16. The opening 82 has a width 84 and a depth 86 that are sufficient for receiving the retainer 68 in the orientation illustrated in FIG. 1. In the illustrated embodiment, the upper plate 80 is separate from and welded to the first and second walls 14 and 16, although it will be appreciated that in variations, the first connector apparatus 12 may be unitarily formed with the upper plate 80, or the first connector apparatus and the upper plate may be formed from other combinations of components.

Figure 3:
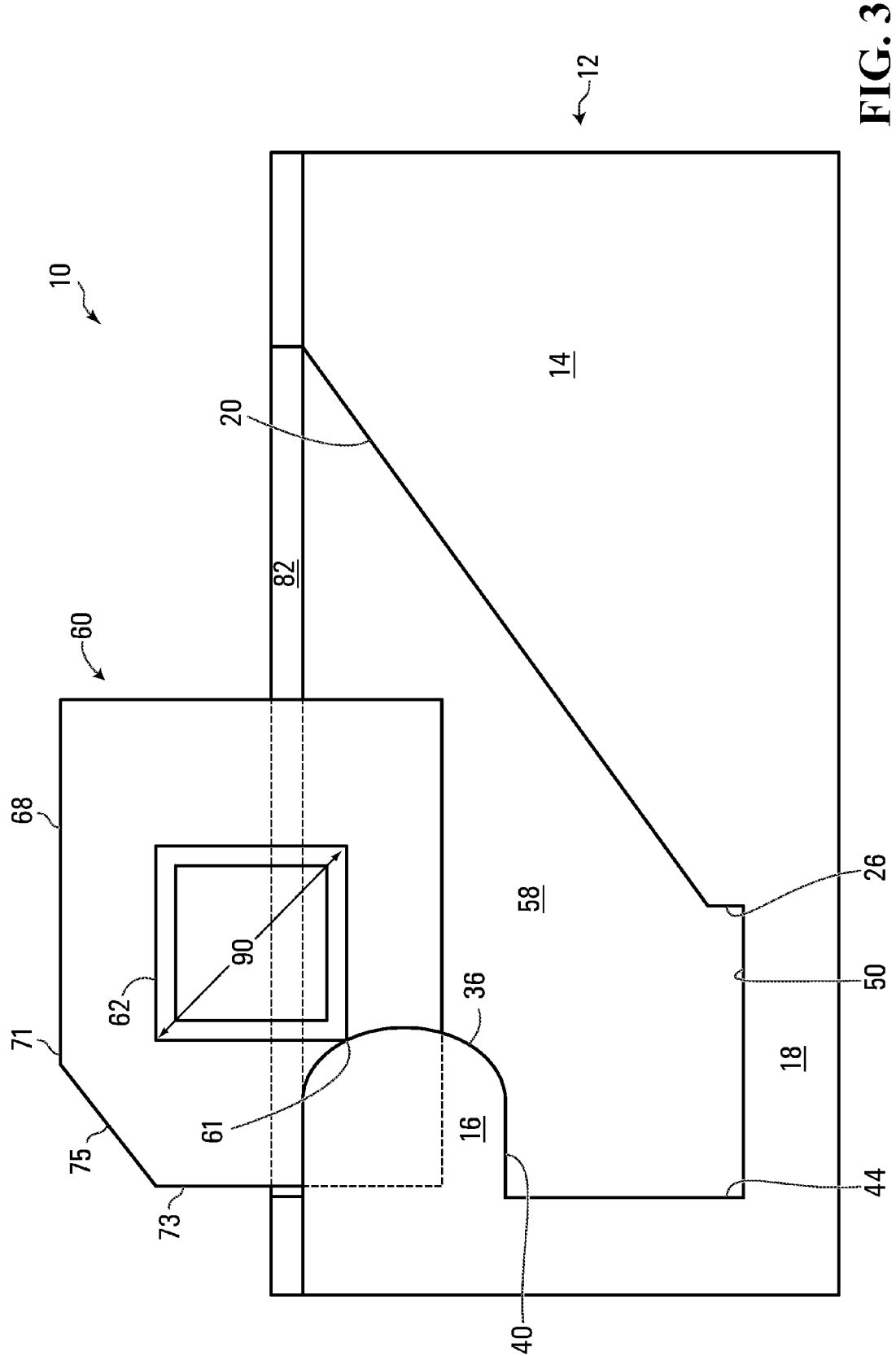
FIG. 3 is a front elevation view of the connector system of FIG. 1 in a first configuration.

Referring to FIG. 3, an example of a process for connecting the first and second connector apparatuses 12 and 60 is illustrated. In the example of FIG. 3, a first edge 61 of the projection 62 of the second connector apparatus 60 contacts the second guiding surface 36 of the first connector apparatus 12. The second connector apparatus 60 may be urged by forces such as gravity, for example, in a direction towards the fourth stopping surface 50, such that the projection 62 is guided by the second guiding surface 36 towards the first guiding surface 20. Referring to FIGS. 1 and 3, it will be appreciated that the retainer 68 may be received in and passed through the opening 82 and thus positioned on a back side 88 of the first connector apparatus 12, behind the first and second walls 14 and 16, while the projection 62 is received in and extends through the opening 58 to a front side 89 of the first connector apparatus 12.

Figure 4:
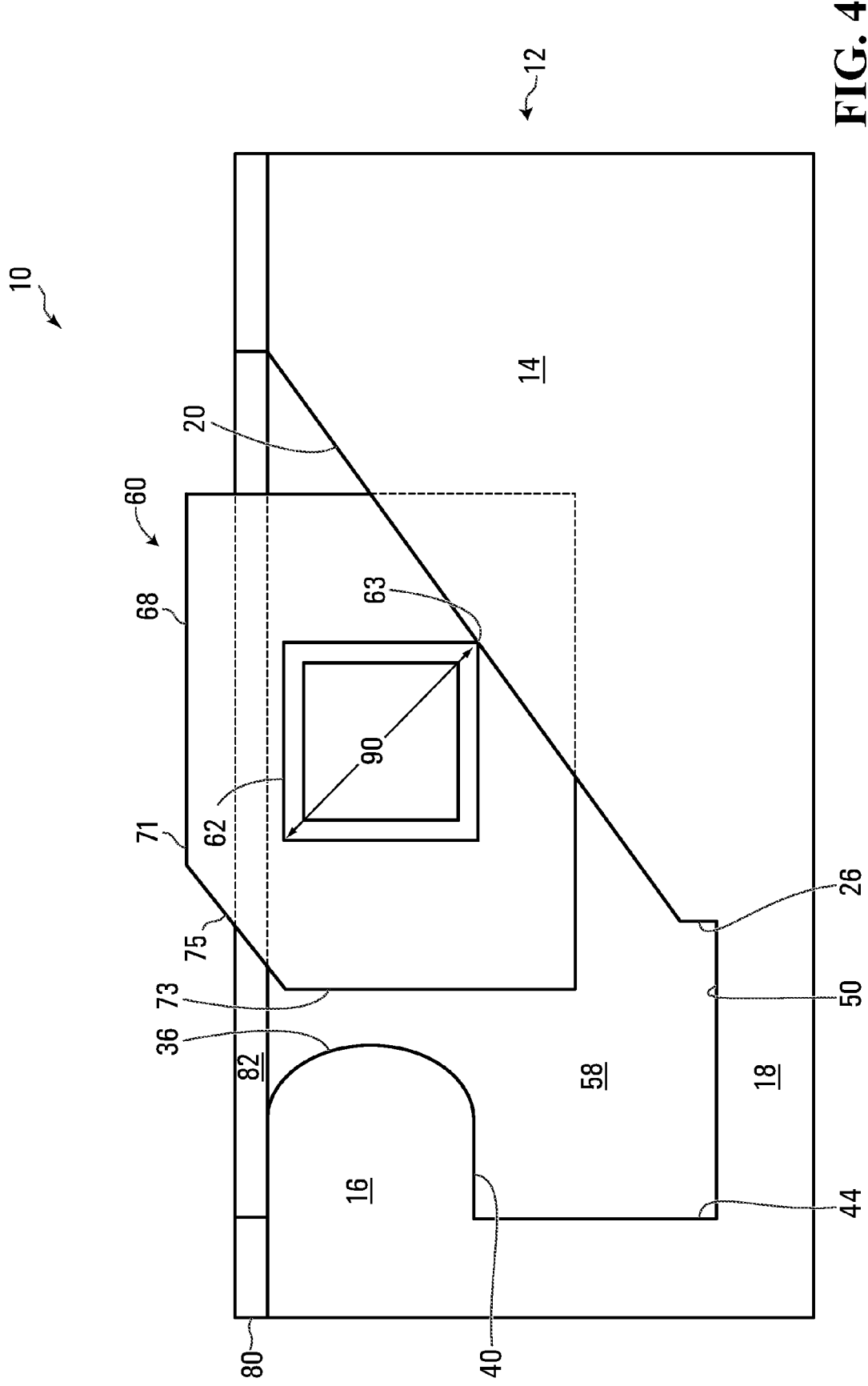
FIG. 4 is a front elevation view of the connector system of FIG. 1 in a second configuration.

Referring to FIG. 4, when the second guiding surface 36 guides the projection 62 to the first guiding surface 20, or if the projection 62 is placed directly on the first guiding surface 20, a second edge 63 of the projection 62 contacts the first guiding surface 20, and is urged by forces such as gravity, for example, along the first guiding surface 20 in a direction towards the fourth stopping surface 50, whereupon the second edge 63 rides down the first guiding surface 20 until the projection 62 is held between the stopping surfaces 26, 40, 44, and 50.

Still referring to FIG. 4, it has been found that removing the triangular section from the corner of the retainer 68, as described above and illustrated in FIGS. 1, 3, and 4, for example, may advantageously prevent the retainer 68 from engaging an edge of the upper plate 80 adjacent the second wall 16 while the second connector apparatus 60 is inserted in or removed from the first connector apparatus 12.

Figure 5:
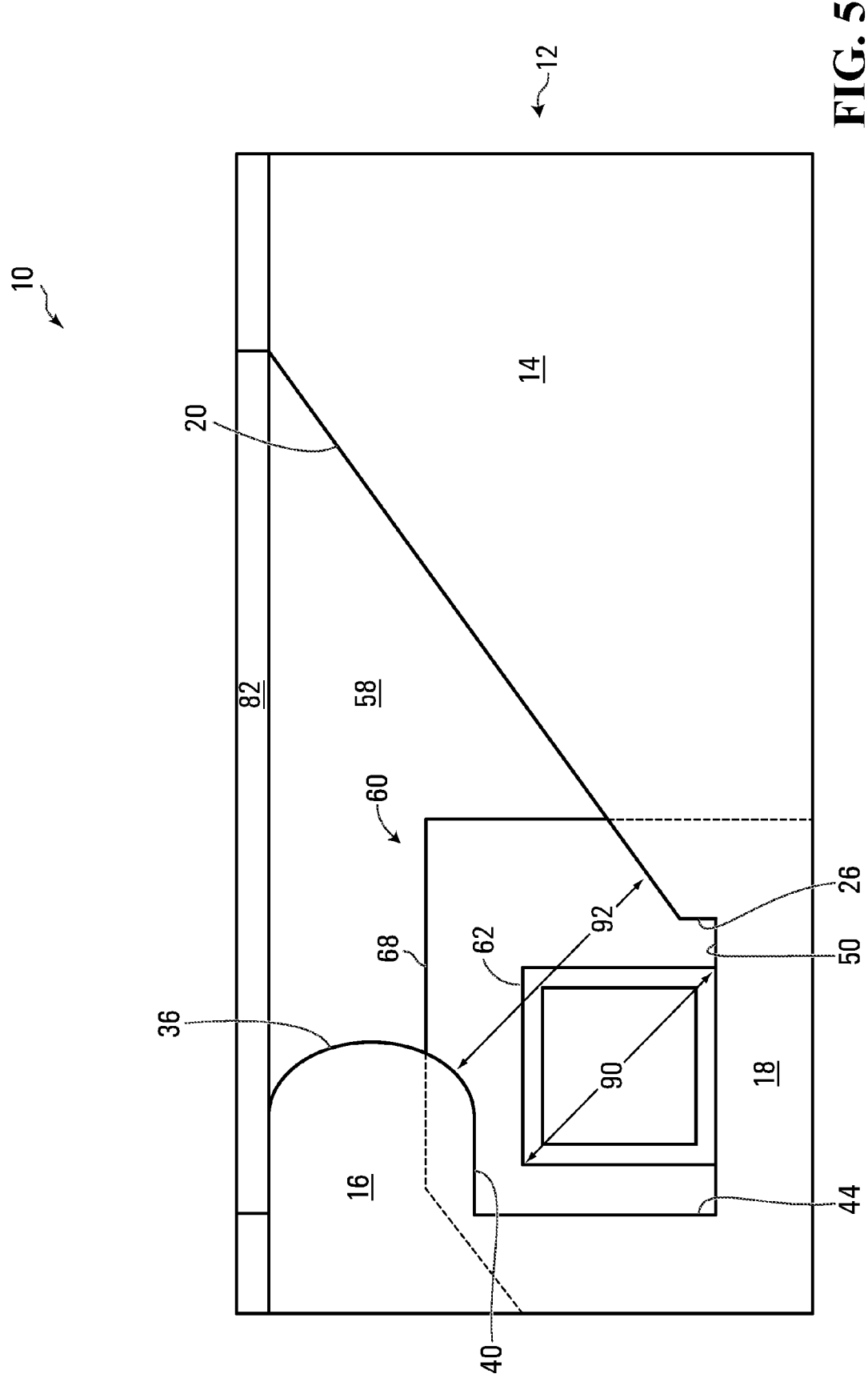
FIG. 5 is a front elevation view of the connector system of FIG. 1 in a third configuration.

Referring to FIG. 5, the connector system 10 is illustrated in an exemplary connected configuration. In the configuration of FIG. 5, the projection 62 rests under the force such as gravity on the fourth stopping surface 50, while margins of at least one of the first and second walls 14 and 16 near the opening 58 and the support 18 engage the retainer 68 on the back side 88 (illustrated in FIG. 1) to prevent the projection 62 from moving in a direction towards the front side 89 (also illustrated in FIG. 1). The first, second, and third, stopping surfaces 26, 40, and 44 prevent movement of the projection 62 in rightward, upward, and leftward directions respectively in the orientation of the illustration of FIG. 5, while the fourth stopping surface 50 prevents the projection 62 from downward movement in the orientation of the illustration of FIG. 5. Therefore, advantageously, the projection 62 is generally prevented from movement in four lateral directions by the stopping surfaces 26, 40, 44, and 50, while the retainer 68 prevents longitudinal movement of the projection 62 towards the front side 89 (also illustrated in FIG. 1), although the second connector apparatus 60 can be disconnected from the first connector apparatus 12 by urging the projection 62 through and out of the opening 58.

Still referring back to FIG. 5, it will be appreciated that the projection 62 has a maximum diagonal width 90 which in the illustrated embodiment, where the projection is 2 inches (5 cm) square, is approximately 2.83 inches (7.2 cm). In the alternative embodiment where the projection 62 has a generally square cross section of approximately 1.5 inches by 1.5 inches (3.81 cm by 3.81 cm), the maximum diagonal width 90 is approximately 2.12 inches (5.39 cm). Preferably, the narrowest spacing 92 between the first and second guiding surfaces 20 and 36 respectively, is slightly greater than the maximum diagonal width 90, in order to permit the projection 62 to pass through the opening 58 while limiting the likelihood that the connector system 10 will be unintentionally disengaged from a connected configuration, such as the exemplary connected configuration illustrated in FIG. 5.

Referring to FIGS. 3 to 5, it will be appreciated that the first and second guiding surfaces 20 and 36 may co-operate to direct a projection 62 of a second connector apparatus 60 that is dropped by equipment such as a loader or forklift, for example, into a connected configuration with a first connector apparatus 12, without requiring the equipment to drop the projection 62 in a precise location. This feature is particularly advantageous when the projection 62 is coupled to a heavy object such as a rig mat, for example, where precise positioning of the heavy object may be difficult. Referring back to FIG. 1, it will be appreciated that the opening 82 may provide a visual indicator of approximately where a projection 62 should be positioned, which is also particularly advantageous when positioning a projection 62 that is coupled to a heavy object.

It will be appreciated that alternative embodiments may include variations of the configurations described above. For example, the retainer 68 need not have the illustrated shape, but may be generally rectangular, circular, elliptical, or octagonal, for example. Furthermore, the projection 62 need not have a square cross section but may have a generally rectangular, trapezoidal, or octagonal cross section, for example. Preferred embodiments include a projection 62 having a cross sectional configuration generally complementary to the shape of the opening defined by the stopping surfaces 26, 40, 44, and 50 in order to connect the first connector apparatus 12 with the second connector apparatus 60. Also, in preferred embodiments, the retainer 68 is large enough not to pass through the opening 58 when the connector system 10 is in a connected configuration, such as the exemplary connected configuration illustrated in FIG. 5, but is small enough to pass through the opening 82 to be received on the back side 88 (illustrated in FIG. 1) of the first connector apparatus 12.

Figure 6:
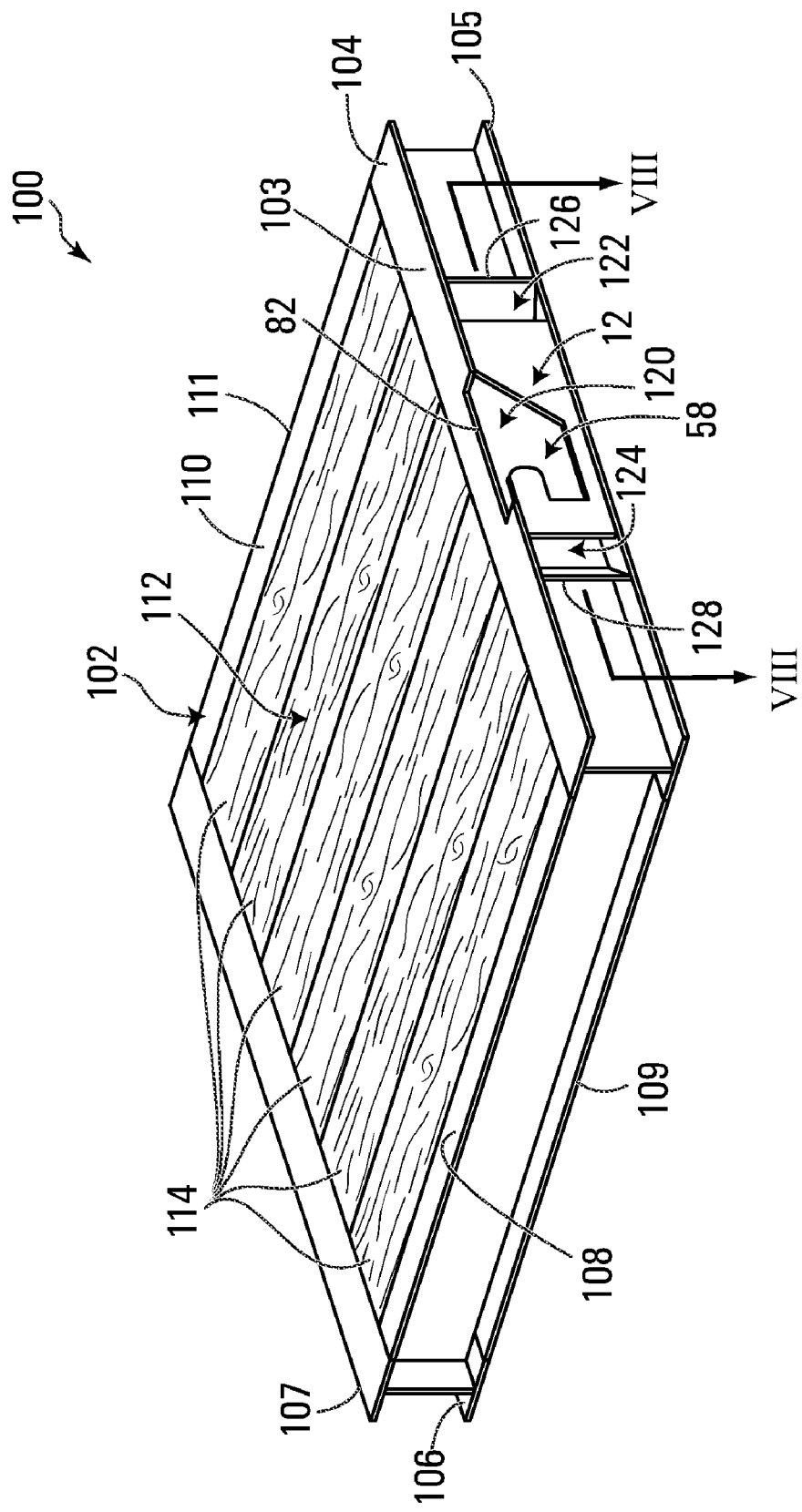
FIG. 6 is a first perspective view of a rig mat according to an embodiment of the invention, showing a first side bearing a first part of the connector system.

Referring to FIG. 6, a rig mat according to an embodiment of the invention is shown generally at 100. The rig mat 100 includes a frame 102 preferably made from metal such as steel. In a preferred embodiment, the frame 102 is formed from first and second generally parallel spaced apart I-beams 104 and 106 defining first and second generally parallel spaced apart edges 105 and 107 respectively, and by third and fourth generally parallel spaced apart I-beams 108 and 110 extending between respective ends of the first and second I-beams 104 and 106. The third and fourth I-beams 108 and 110 define third and fourth generally parallel and spaced apart edges 109 and 111 respectively, extending between the first and second edges 105 and 107. A preferred embodiment also includes a platform 112 formed from planks of wood 114. However, it will be appreciated that alternative embodiments may include other materials, and other configurations, for the rig mat 100. For example, variations may include a steel plate or steel C-channel (not shown) in place of one or both of the third and fourth I-beams 108 and 110. The platform 112 may be supported by cross braces or a center beam (not shown). Also, in variations, the platform 112 may be formed from separate pieces of wood or from a single piece of wood, or it may be formed from one or more pieces formed from resin and glass, a composite plastic, or other known advanced materials.

In the embodiment illustrated in FIG. 6, a first connector apparatus 12 is coupled, preferably by welding, to flanges of the first I-beam 104, in a position spaced apart from the web of the first I-beam 104. A flange 103 of the first I-beam 104 is adjacent the first connector apparatus 12 and defines the opening 82 illustrated in FIGS. 1-5.

Figure 7:
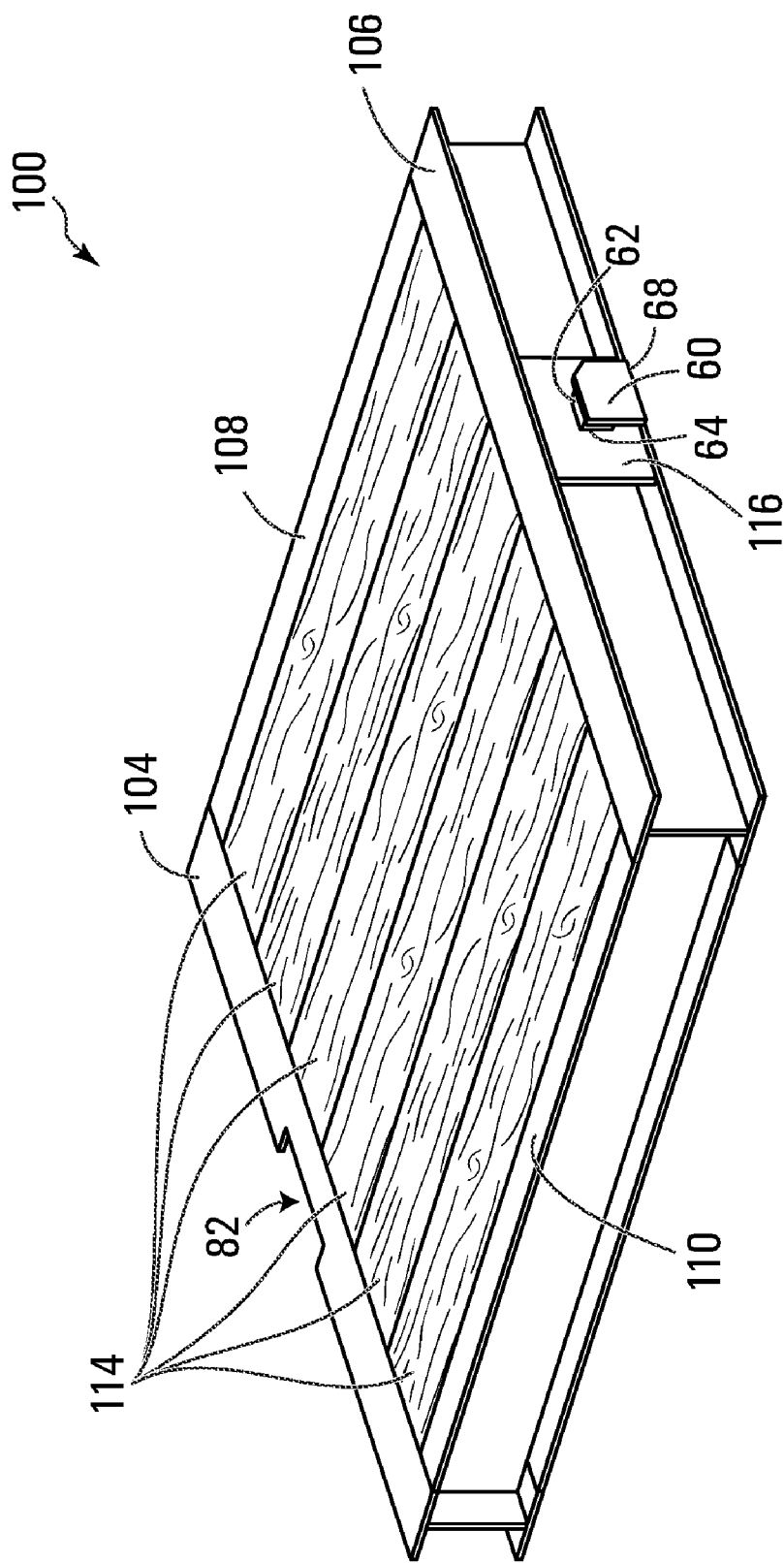
FIG. 7 is a second perspective view of the rig mat of FIG. 6, showing a second side bearing a second part of the connector system.

Referring to FIG. 7, the second I-beam 106 supports a second connector apparatus 60 of the type illustrated in FIGS. 1 and 3 to 5. In the illustrated embodiment, the first end 64 of the projection 62 is welded to a plate 116 that is welded to the flanges of the second I-beam 106, in a position spaced apart from the web of the second I-beam 106, for example. As noted above, a triangular portion is preferably removed from a corner of the retainer 68 in order to prevent the retainer from engaging an edge of the upper plate 80 adjacent the second wall 16 (illustrated in FIGS. 1 and 2) of an adjacent rig mat 100 while the second connector apparatus 60 is inserted in or removed from the first connector apparatus 12 of the adjacent rig mat 100. Therefore, as illustrated in FIG. 7, a triangular portion is removed from a corner of the retainer 68 that would contact an edge of the upper plate 80 adjacent the second wall 16 (illustrated in FIGS. 1 and 2) of an adjacent rig mat 100 while the second connector apparatus 60 is inserted in or removed from the first connector apparatus 12 of the adjacent rig mat 100.

It will be appreciated that a plurality of rig mats 100 may be connected using the first and second connector apparatuses 12 and 60 of adjacent such rig mats, by following the acts illustrated in FIGS. 3 to 5, in order to form a temporary surface upon which motor vehicles can be operated while minimizing damage to a surface such as arctic tundra below, for example.

Referring back to FIG. 1, the projection 62 has a length 69 which, as illustrated in FIG. 7, determines a spacing distance between the retainer 68 and the plate 116. It will be appreciated that the length 69 will also generally determine the maximum size of gaps between adjacent rig mats 100. For example, a larger length 69 is desirable to provide for relatively large gaps, which facilitate the construction of a temporary rigid surface on a generally uneven surface below, while a shorter length 69 would be desirable to minimize gaps between adjacent rig mats 100, where the surface below is relatively planar. In the illustrated embodiment, the length 69 is approximately 1.5 inches (3.8 cm).

Figure 8:
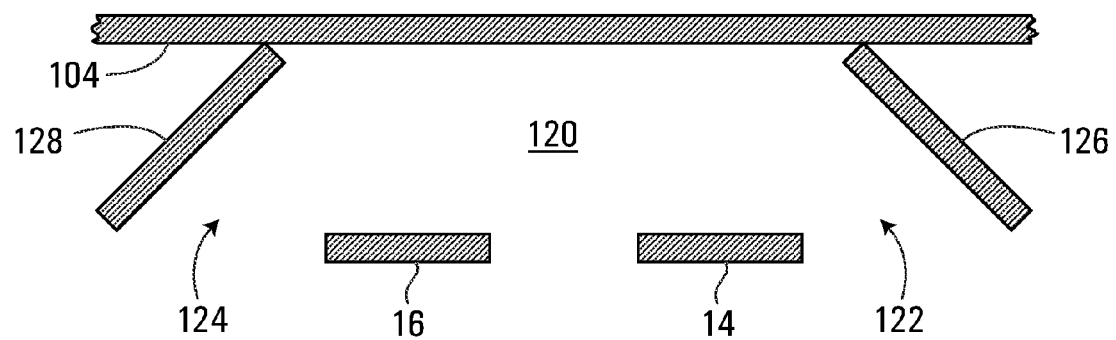
FIG. 8 is a cross-sectional view of the rig mat of FIG. 6 along the line VIII-VIII in FIG. 6.

Referring back to FIG. 6, the first I-beam 104 and the first connector apparatus 12 define a cavity 120 for receiving the retainer 68 of the second connector apparatus 60. The cavity 120 is in communication with the openings 58 and 82, and also has openings 122 and 124 defined by opposite sides of the first connector apparatus 12 and by the first I-beam 104. The openings 122 and 124 advantageously permit passage of a fluid such as water through the cavity 120 for cleaning the cavity, in order to remove debris, mud, ice, or snow therefrom, for example. Referring to FIGS. 6 and 8, the rig mat 100 optionally further includes first and second fluid deflectors 126 and 128 supported by the first I-beam 104 and arranged to help define the openings 122 and 124 adjacent the first and second walls 14 and 16 respectively. In this embodiment, fluid such as high pressure water or air can more easily be directed through the openings 122 and 124 to remove debris, mud, ice, or snow, for example, from the cavity 120.

Figure 9:
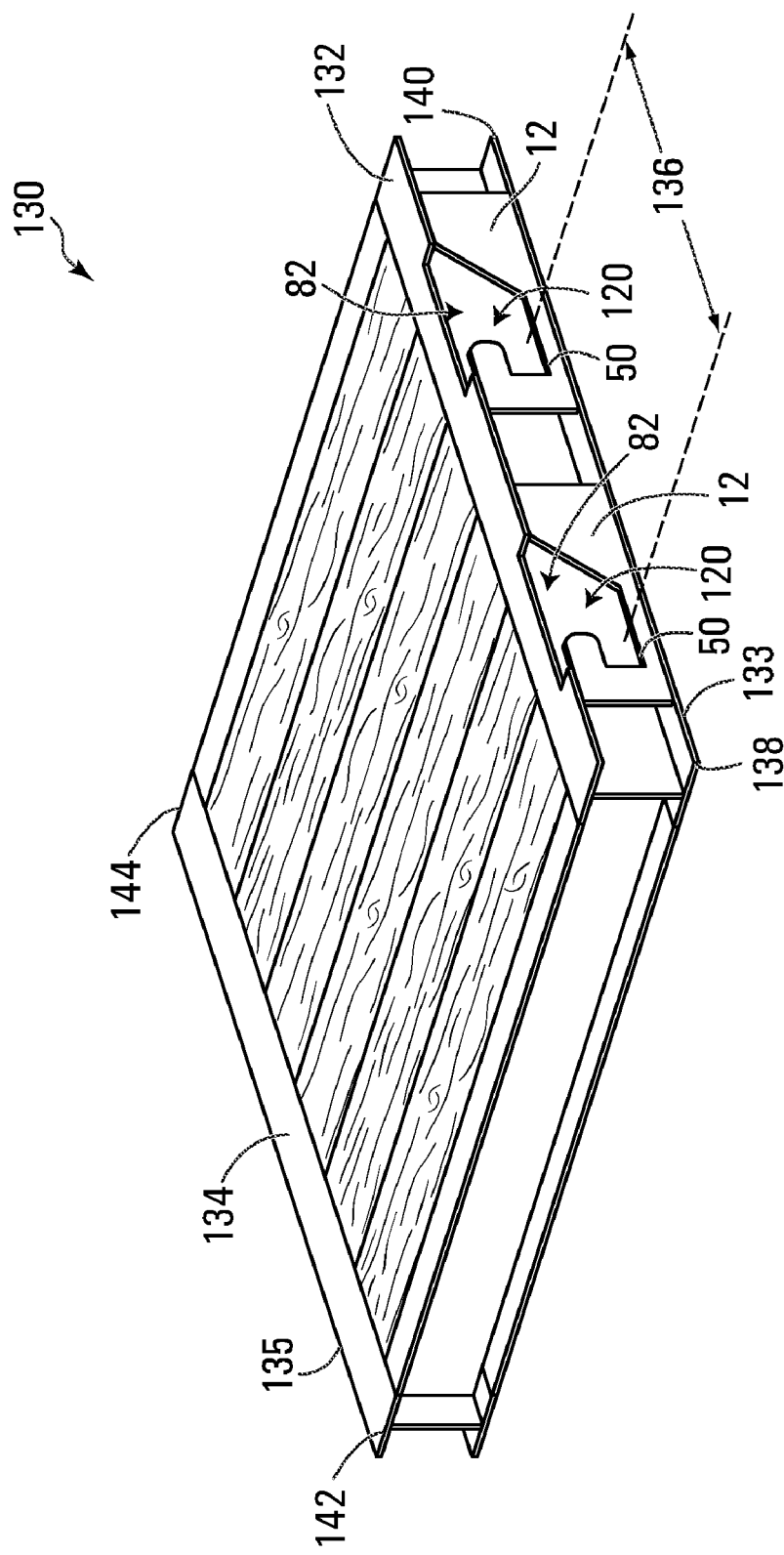
FIG. 9 is a first perspective view of a rig mat according to a further embodiment of the invention, showing a first side bearing a first part of the connector system.
Figure 10:
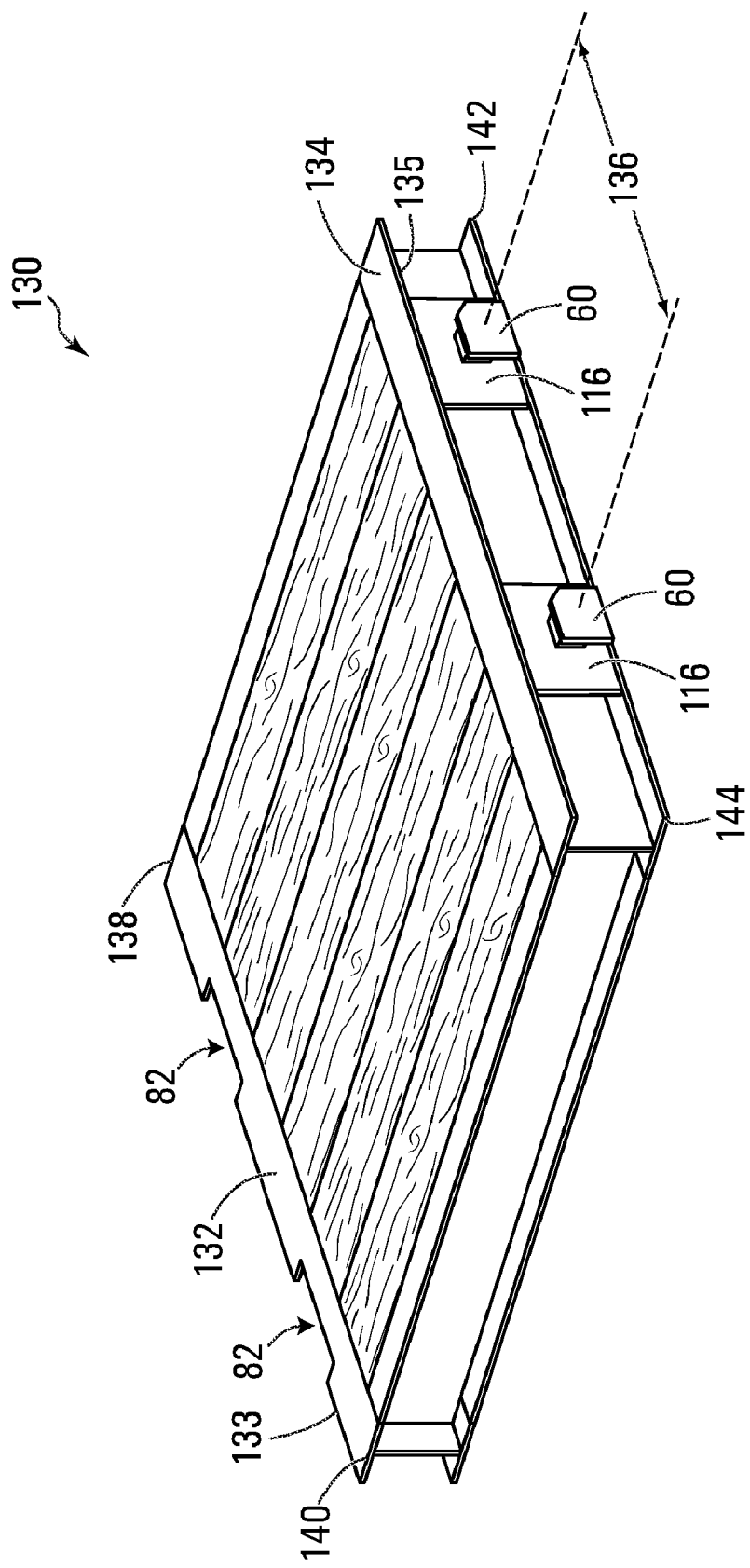
FIG. 10 is a second perspective view of the rig mat of FIG. 9, showing a second side bearing a second part of the connector system.

Referring to FIG. 9, a rig mat according to a further embodiment of the invention is shown generally at 130. The rig mat 130 includes two spaced apart first connector apparatuses 12 and corresponding openings 82 in a flange of a first I-beam 132. The two first connector apparatuses 12 are for receiving and connecting with respective corresponding second connector apparatuses 60 on a second I-beam 134 of one or more adjacent rig mats 130, as illustrated in FIG. 10. Referring back to FIG. 9, centers of the fourth stopping surfaces 50 of the two first connector apparatuses 12 are separated by a distance 136, and referring to FIG. 10, centers of the two second connector apparatuses 60 are preferably separated by the distance 136, such that the pair of first connector apparatuses 12 can be connected with a pair of second connector apparatuses 60 on an adjacent rig mat 130. It will be appreciated that each of the cavities 120 in the rig mat 130 may preferably be surrounded by fluid deflectors 126 and 128, as illustrated in FIG. 8. It will also be appreciated that a plurality of rig mats 130 of the type shown in FIGS. 9 and 10 may be interconnected to form a temporary surface on which motor vehicles, for example, may be operated, and that the pairs of connector apparatuses 12 and 60 may provide additional stability to the resulting system.

Referring to FIGS. 9 and 10, the first and second I-beams 132 and 134 define first and second generally parallel spaced apart edges 133 and 135 respectively. The first edge 133 has third and fourth ends 138 and 140, and the second edge 135 has fifth and sixth ends 142 and 144. Preferably, the first and second edges 133 and 135 have a common length approximately two times the distance 136, and centers of the fourth stopping surfaces 50 of the two first connector apparatuses 12 are approximately one quarter of the distance 136 from the third and fourth ends 138 and 140 respectively. Also, the two second connector apparatuses 60 are preferably one quarter of the distance 136 from the fifth and sixth ends 142 and 144 respectively. This configuration is preferable because in a system of a plurality of rig mats 130, the connectors on adjacent rig mats will generally be evenly spaced by the distance 136, which allows adjacent rig mats to be aligned or staggered in a brick pattern (as illustrated in FIG. 16, for example), which may provide additional stability to the system.

Figure 11:
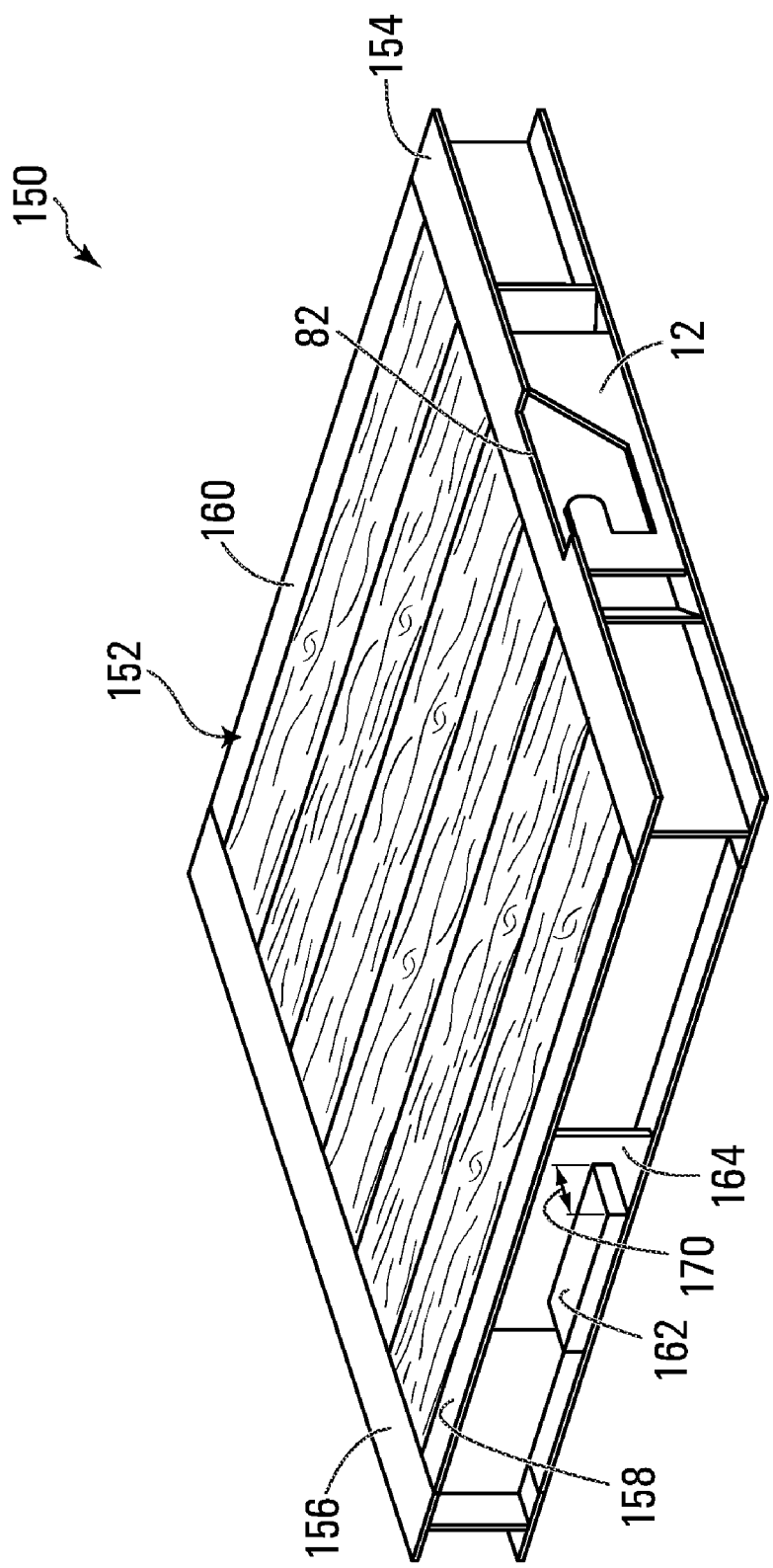
FIG. 11 is a first perspective view of a rig mat according to a further embodiment of the invention, illustrating a first guide.

Referring to FIG. 11, a rig mat according to a further embodiment of the invention is shown generally at 150. The rig mat 150 includes a frame 152 preferably made of metal such as steel, and in the illustrated embodiment includes first and second generally parallel spaced apart I-beams 154 and 156, and third and fourth generally parallel spaced apart I-beams 158 and 160 extending between respective ends of the first and second I-beams 154 and 156. The first I-beam 154 supports a first connector apparatus 12 as described above, and the third I-beam 158 supports a first guide 162. In the illustrated embodiment, the first guide 162 is a projection coupled by welding to a plate 164 that is coupled by welding to flanges of the third I-beam 158 in a position spaced apart from the web of the third I-beam 158.

Figure 12:
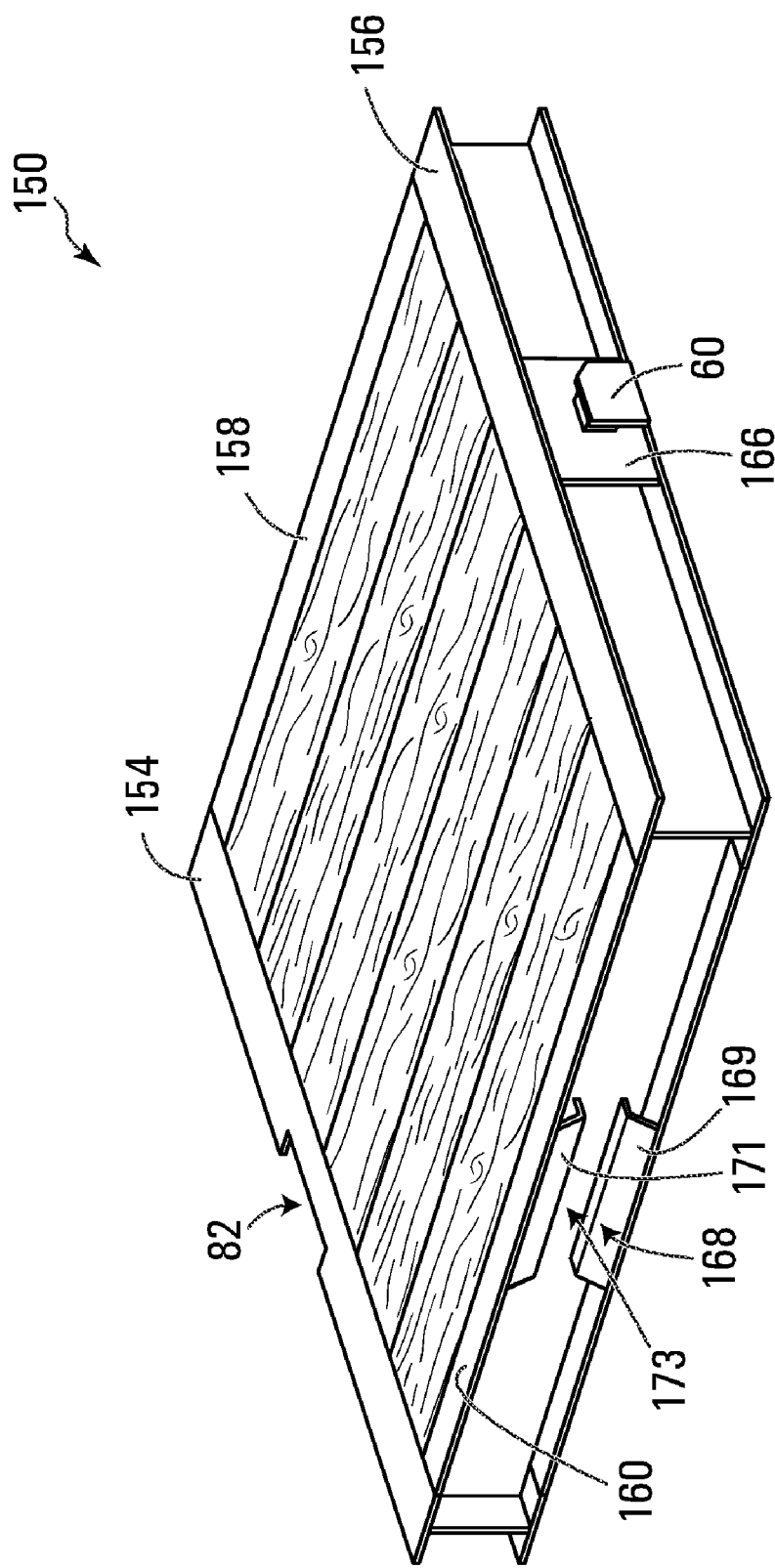
FIG. 12 is a second perspective view of the rig mat of FIG. 11, showing a second guide that co-operates with a first guide of the type shown in FIG. 11, of an adjacent rig mat.

Referring to FIG. 12, the second I-beam 156 supports a plate 166 that supports a second connector apparatus 60, and the fourth I-beam 160 is fitted with bent plates 169 and 171 welded to the flanges of the fourth I-beam 160 to form a second guide, shown generally at 168 and operable to receive the first guide 162 of an adjacent rig mat 150. In the illustrated embodiment, the second guide 168 defines a recess 173 for holding the first guide 162 of the adjacent rig mat 150. The bent plates 169 and 171 of the second guide 168 are formed to have an outwardly sloped region, as illustrated in FIG. 12, for guiding the first guide 162 of the adjacent rig mat 150.

It will be appreciated that variations of the rig mat 150 may include one or a plurality of connector apparatuses 12, openings 82, and connector apparatuses 60, and that variations may include one or a plurality of first guides 162 and second guides 168. Also, it will be appreciated that in variations, the plate 164 may extend between the first and second I-beams 154 and 156 and be coupled to the first and second I-beams, in which variations the third I-beam 158 may be absent. Furthermore, these and other variations may include steel C-channel (not shown) in place of the fourth I-beam 160.

Figure 13:
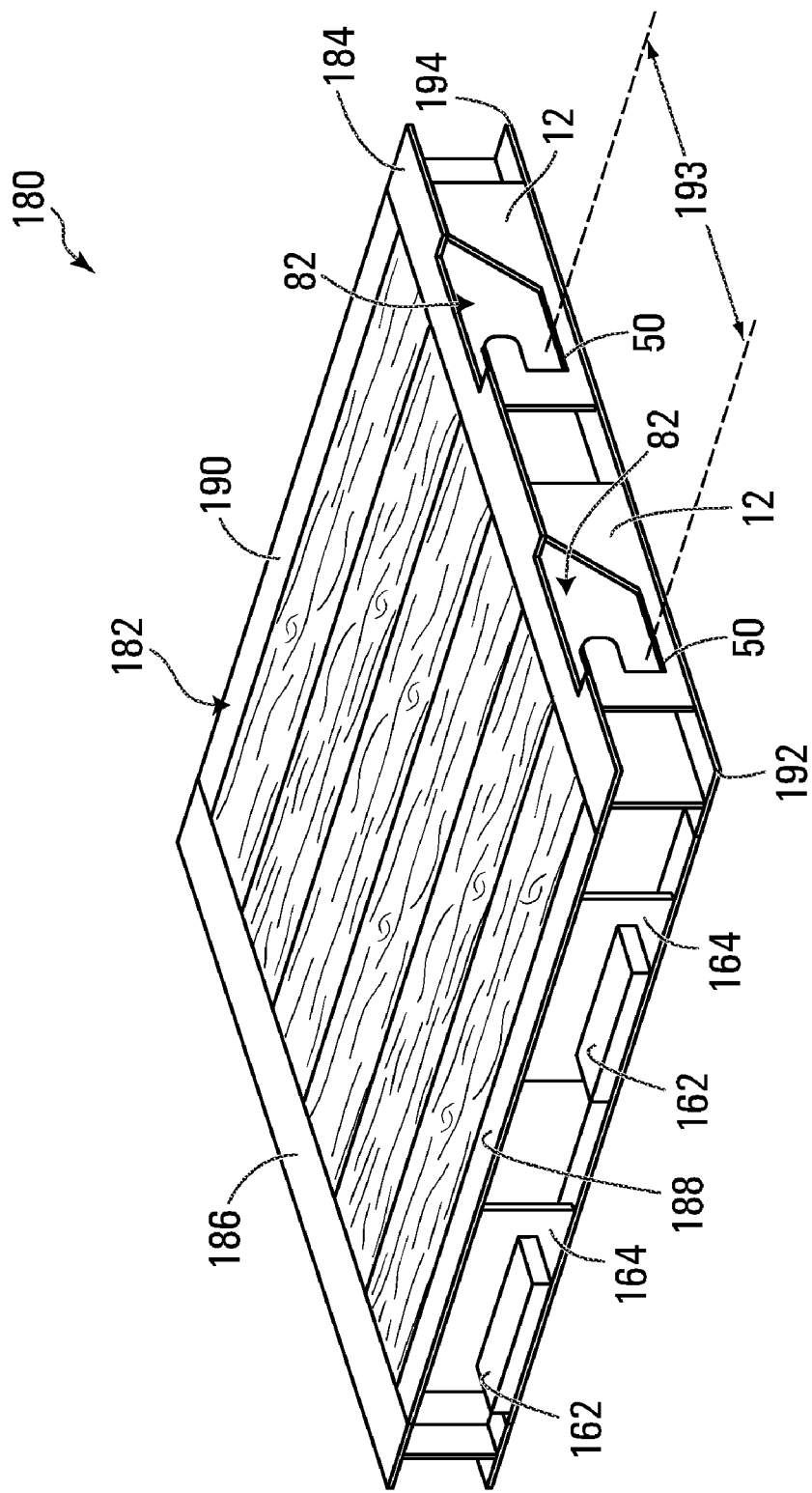
FIG. 13 is a first perspective view of a rig mat according to a further embodiment of the invention, illustrating a plurality of guides of the type shown in FIG. 11.

Referring to FIG. 13, a rig mat according to a further embodiment of the invention is shown generally at 180. The rig mat 180 includes a frame 182 preferably made of metal such as steel, and in the illustrated embodiment, includes first and second generally parallel spaced apart I-beams 184 and 186, and third and fourth generally parallel spaced apart I-beams 188 and 190 extending between respective ends of the first and second I-beams 184 and 186. The first I-beam 184 supports two first connector apparatuses 12 as described above. In the embodiment shown in FIG. 13, the two first connector apparatuses 12 are positioned in connection with the embodiment of FIG. 9, such that centers of the fourth stopping surfaces 50 of the two first connector apparatuses 12 are separated by a distance 193, and are approximately half of the distance 193 from respective ends 192 and 194 of the first I-beam 184. The first I-beam 184 also defines two openings 82 adjacent respective first connector apparatuses 12, as described above.

Still referring to FIG. 13, the third I-beam 188 also supports two spaced apart first guides 162, which in the illustrated embodiment are projections coupled by welding to respective plates 164 that are coupled by welding to flanges of the third I-beam 188.

Figure 14:
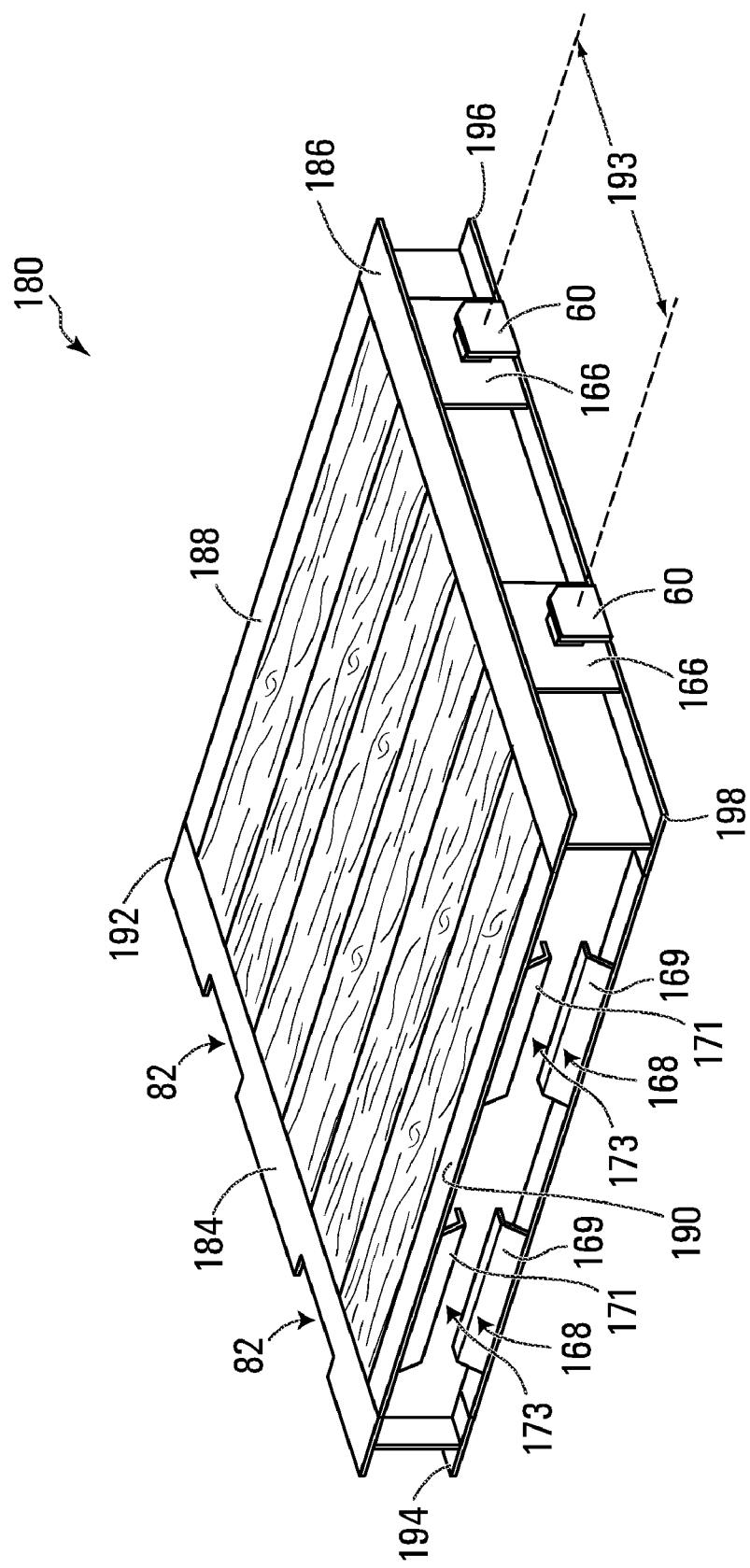
FIG. 14 is a second perspective view of the rig mat of FIG. 13, illustrating a plurality of guides of the type shown in FIG. 12.

Referring to FIG. 14, the second I-beam 186 supports two plates 166 that support respective second connector apparatuses 60, wherein centers of the second connector apparatuses 60 are separated by approximately the distance 193 and are approximately half of the distance 193 from respective ends 196 and 198 of the second I-beam 186, so that centers of the second connector apparatuses 60 of a rig mat 180 are generally aligned with centers of the fourth stopping surfaces 50 of the first connector apparatuses 12 of an adjacent rig mat 180.

Referring to FIGS. 13 and 14, the fourth I-beam 190 has two pairs of bent plates 169 and 171 that define two second guides, shown generally at 168, and spaced apart to align with respective ones of the first guides 162 of an adjacent rig mat 180. In the illustrated embodiment, the second guides 168 define recesses 173 for holding respective first guides 162 of the adjacent rig mat 180. Preferably, the two second guides 168 do not extend the full length of the fourth I-beam 190 so that debris such as mud, snow, or ice, for example, can easily be removed from the second guides using a fluid such as pressurized water.

Still referring to FIGS. 13 and 14, it will be appreciated that in variations, the two first guides 162 may be supported by a single plate 164 extending between the first and second I-beams 184 and 186 and be coupled to the first and second I-beams, in which variations the third I-beam 188 may be absent. Furthermore, these and other variations may include steel C-channel (not shown) in place of the fourth I-beam 190.

In operation, a plurality of rig mats 150 or 180 may be interconnected by connecting first connector apparatuses 12 to second connector apparatuses 60 of adjacent rig mats, as illustrated above. Furthermore, first guides 162 may be held in second guides 168 of adjacent rig mats 150 or 180. It will be appreciated that the combination of the above-described connection apparatuses and guides permit the construction of a temporary surface having a desired length and width, that can be assembled from reusable rig mats, and disassembled.

For example, referring to FIG. 15, a system of rig mats 180 is shown generally at 210. In the example of FIG. 15, six rig mats 180 are interconnected such that first connector apparatuses 12 (shown in FIG. 13) of rig mats 180 receive and connect with second connector apparatuses 60 of transversely adjacent rig mats 180, while first guides 162 of rig mats 180 are also received in second guides 168 (shown in FIG. 14) of longitudinally adjacent rig mats 180.

Referring to FIG. 16, a further example of the system of rig mats 180 is shown generally at 220. In the example of FIG. 16, first guides 162 of rig mats 180 are received in second guides 168 (shown in FIG. 14) of transversely adjacent rig mats 180. However, the first connector apparatuses 12 (shown in FIG. 13) of rig mats 180 are connected with second connector apparatuses 60 of respective rig mats 180, thereby staggering the transversely adjacent rig mats 180. It will be appreciated that the configuration of first and second connector apparatuses 12 and 60 in the exemplary rig mat 180 of FIGS. 13 and 14 permits either of the configurations in FIGS. 15 and 16, or a combination of the configurations in FIGS. 15 and 16, advantageously permitting a variety of desirable configurations of interconnected rig mats 180.

Referring back to FIG. 2, the horizontal run 32 of the first guiding surface 20 is preferably longer than a length 170 of the first guide 162 illustrated in FIG. 11. Thereby, during assembly of a system of rig mats 150, a projection 62 of a connector apparatus 60 can travel along the first guiding surface 20 at least a sufficient distance to permit full insertion or removal of the first guide 162 from the second guide 168 of an adjacent rig mat 150.

While specific embodiments of the invention have been described and illustrated, such embodiments should be considered illustrative of the invention only and not as limiting the invention.

What is claimed is:

1. A connectable panel comprising:
   a frame having first and second parallel and spaced apart edges, said first edge including at least one connector apparatus comprising:
      first and second spaced apart generally coplanar walls; and
      a support between said first and second walls;
      said first wall comprising:
         a first guiding surface; and
         a first stopping surface extending at a first angle to said first guiding surface;
      said second wall comprising:
         a second guiding surface opposite at least a portion of said first guiding surface and generally facing towards said first guiding surface;
         a second stopping surface extending from said second guiding surface away from said first guiding surface; and
         a third stopping surface extending at a second angle to said second stopping surface, at least a portion of said third stopping surface opposite said first stopping surface;
      said support having a fourth stopping surface generally opposite said second stopping surface and disposed at third and fourth angles to said first and third stopping surfaces respectively; and
   at least one projection projecting away from said second edge, said projection having first and second opposite ends, said first end coupled to said second edge and said second end having a retainer thereon;
   wherein said first and second guiding surfaces of said at least one connector apparatus are positioned to permit passage therebetween of said projection of a first adjacent connectable panel;
   wherein said first, second, third, and fourth stopping surfaces of said connector apparatus are positioned to hold said projection of the first adjacent connectable panel releasably therebetween and to prevent said retainer of the first adjacent connectable panel from passing therebetween; and
   wherein said frame and said connector apparatus define a cavity for receiving said retainer of the first adjacent connectable panel when said projection of the first adjacent connectable panel is moved between said first and second guiding surfaces and when said projection of the first adjacent connectable panel is positioned between said first, second, third, and fourth stopping surfaces of said connector apparatus.

2. The connectable panel of claim 1 wherein said at least one projection has a generally rectangular cross section.

3. The connectable panel of claim 1 wherein said retainer comprises a generally rectangular plate.

4. The connectable panel of claim 3 wherein said generally rectangular plate includes third and fourth generally perpendicular edges, and a fifth edge extending at an angle between said third and fourth edges.

5. The connectable panel of claim 1 wherein said at least one connector apparatus comprises first and second said connector apparatuses, and wherein said at least one projection comprises first and second said projections.

6. The connectable panel of claim 5 wherein said first and second connector apparatuses are spaced apart by a first distance, and wherein said first and second projections are spaced apart by said first distance.

7. The connectable panel of claim 6 wherein:
   said first edge has third and fourth ends;
   said second edge has fifth and sixth ends;
   said first and second edges have a common length approximately two times said first distance;
   said first connector apparatus is approximately one quarter of said common length from said third end;
   said second connector apparatus is approximately one quarter of said common length from said fourth end;
   said first projection is approximately one quarter of said common length from said fifth end; and
   said second projection is approximately one quarter of said common length from said sixth end.

8. The connectable panel of claim 1 wherein said frame includes a wall, and said wall and said at least one connector apparatus define first and second openings in communication with said cavity for permitting passage of a fluid through said cavity for cleaning said cavity.

9. The connectable panel of claim 8 further comprising first and second fluid deflectors for deflecting fluid passing through said first and second openings respectively.

10. The connectable panel of one of claim 1 wherein the connectable panel has a top surface adjacent said first and second guiding surfaces, and wherein said top surface defines an opening in communication with said cavity for receiving said retainer of the first adjacent connectable panel.

11. The connectable panel of claim 1 wherein said frame has third and fourth generally parallel and spaced apart edges extending between said first and second edges, wherein said third edge includes at least one first guide, and wherein said fourth edge includes at least one second guide, said second guide generally complementary to said first guide for holding said first guide of a second adjacent connectable panel.

12. The connectable panel of claim 11 wherein said first guide comprises at least one protrusion protruding from said third edge, and wherein said second guide comprises at least one recess for holding said at least one protrusion of said second adjacent connectable panel.

13. The connectable panel of claim 12 wherein said first sliding edge of said at least one connector apparatus extends across a second distance parallel to said first edge, and wherein said at least one protrusion extends a third distance from said third edge, said third distance being less than said second distance.

14. The connectable panel of claim 12 wherein said at least one recess includes an outwardly sloped region for guiding said at least one protrusion of said second adjacent connectable panel into said at least one recess.

15. The connectable panel of claim 1 wherein said first and second guiding surfaces and said first, second, third, and fourth stopping surfaces define an opening generally in a plane.

16. The connectable panel of claim 1 wherein said first guiding surface is flat.

17. The connectable panel of claim 1 wherein said second guiding surface is continuously curved.

18. The connectable panel of claim 17 wherein said second guiding surface is generally semi-circular.

19. The connectable panel of claim 1 wherein said first, second, third, and fourth stopping surfaces are generally flat.

20. The connectable panel of claim 1 wherein said second, third, and fourth angles are generally right angles.

21. The connectable panel of claim 1 wherein said first and third stopping surfaces are generally parallel.

22. The connectable panel of claim 1 wherein said second and fourth stopping surfaces are generally parallel.

23. The connectable panel of claim 1 wherein said first and second walls and said support are integrally formed.

* * * * *